Oct. 8, 1968   W. A. GOLDMAN   3,405,025
RETRO-REFLECTIVE ASSEMBLY AND METHOD OF MAKING THE SAME
Filed June 17, 1965
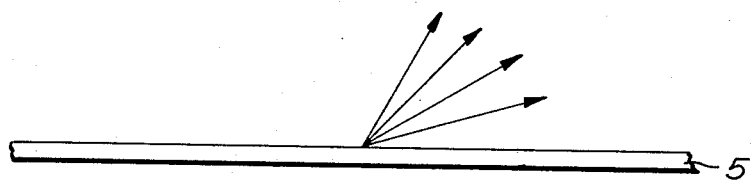
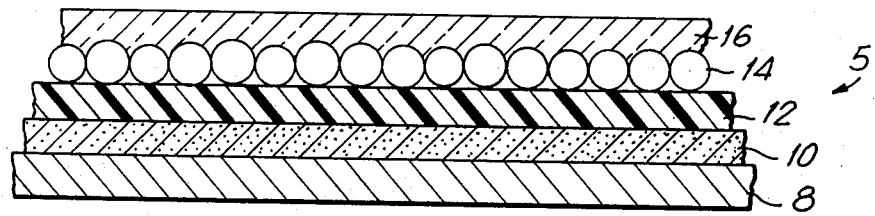
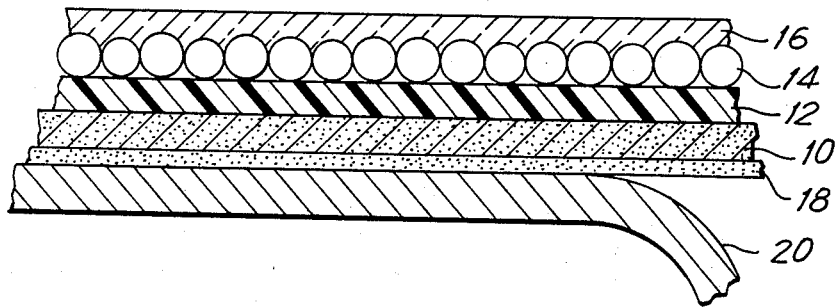
INVENTOR
WILLIAM A. GOLDMAN
BY
ATTORNEYS

United States Patent Office 3,405,025
Patented Oct. 8, 1968

3,405,025
RETRO-REFLECTIVE ASSEMBLY AND METHOD OF MAKING THE SAME
William A. Goldman, New York, N.Y., assignor to Canrad Precision Industries, Inc., New York, N.Y., a corporation of New York
Filed June 17, 1965, Ser. No. 464,744
17 Claims. (Cl. 161—4)

ABSTRACT OF THE DISCLOSURE

A retro-reflecting surface including a plurality of transparent glass beads forming a surface monolayer of lens elements electrostatically adhered to a reflective backing unit by means of a transparent pressure sensitive resinous layer, said beads being bonded tangentially to the upper surface of said layer in spaced relation so as to lie on top of said resinous layer.

---

This invention is directed to a retroreflecting surface providing reflected light of greater angularity and brilliance and to a method of preparing this surface. More particularly, this invention is directed to a retroreflective surface made up of glass beads wherein the glass beads are not imbedded in any manner in an adhesive.

The term retroreflection is hereinafter used to designate a reflective surface or area which will reflect an incident beam or ray of light in such a manner that a brilliant cone of light, such as might come from an automobile headlight, is selectively returned to the source even though the incident light strikes the reflecting surface at an angle. Thus the term distinguishes this type of reflection from that achieved by a mirror which gives a specular reflection and from a diffusing surface which diffuses or dissipates the incident light in all directions.

Reflectors of the retroreflecting type are generally employed where the incident beam strikes a reflecting surface which is otherwise in partial or total darkness. In particular, retroreflecting surfaces are used on highway marking signs and advertising signs. In such cases, it is absolutely essential that the reflection is transmitted back to the source of the incident light, even though the incident light may strike the reflecting surface at an angle. In the case of highway marking signs it is also necessary that a maximum amount of brilliance is retained so that the sign may be visible from a suitable distance and may be clear enough to avoid any possible misinterpretation of its meaning.

Retroreflecting surfaces, generally comprise a plurality of glass beads in spaced relationship serving as spherical lenses united by means of an adhesive layer to a reflecting surface such as a reflective metal layer or a reflective pigmented layer. Generally the glass beads are kept in place and in a spaced relationship in the retroflecting surface by means of partially or totally imbedding the beads in an adhesive layer. This construction has many drawbacks, the main drawback being that since the effective refractive index of the beads depends not only on the refractive index of the bead but on the medium surrounding it, there is a reduction in the effective refractive index of the glass beads. This decrease in the effective refractive index of the glass beads detracts markedly from the brilliance and angularity of light obtained from the retroreflecting surface. In order to compensate for this loss of reflection and refractivity, it has been necessary to either increase the distance from the glass bead to the reflective surface or to utilize precision tooled glass beads of uniform focal length having a high refractive index. Both of these methods have proven extremely disadvantageous. The use of glass beads with a high and uniform refractive index is extremely expensive, due to the fact that the glass beads have to be uniformly precision tooled, and have high and uniform refractive indexes. However, while the use of such glass beads or the use of greater thicknesses of the adhesive layer have compensated somewhat for the loss of angularity and brilliance, there is still a loss in the brilliance and angularity of the light reflected from the reflecting surfaces due to the fact that the beads are imbedded in the adhesive layer.

Another method for overcoming the loss of refractive index of the beads has been to utilize an anchoring network or anchoring beads spaced between the individual glass beads in order to keep the beads in place on the retroreflecting surface. This procedure has also proven unsatisfactory since while the beads need not be imbedded as deeply in the adhesive layer, they must still be imbedded in the adhesive layer to keep the beads in place and provide the proper spacing in the retroreflecting surface. Hence by this procedure there still is a resultant loss in the refractive index of the beads. Furthermore, the placing of anchoring points or anchoring beads next to the glass beads provides a considerably expensive and time-consuming method of fabricating a retroreflecting surface. Additionally the placing of anchoring points or anchoring beads next to the glass beads considerably decreases the angularity of light obtained from the retroreflecting surface.

Therefore it is an object of this invention to provide a retroreflective surface made up of glass beads wherein the beads are not imbedded in any manner in an adhesive surface so that there is no loss in the refractive index of the beads.

It is a further object of this invention to provide a retroreflective surface that produces greater angularity and brilliance of light reflected therefrom.

It is still a further object of this invention to provide a retroreflecting surface made up of glass beads wherein glass beads of non-uniform size, low refractive index can be utilized while still providing a greater brilliance and angularity of light reflected from said surface.

It is still a further object of this invention to provide a retroreflecting surface made up of glass beads that are not imbedded in an adhesive layer while providing greater angularity and brilliance of light reflected from said surface without utilizing a thick adhesive layer.

These and other objects will become apparent in the following description of the retroreflecting surface of this invention.

I have unexpectedly discovered that when a retroreflecting surface is provided by means of a backing sheet containing a reflective metallic surface which is electrostatically coated with a tacky dimensionally stable partially crosslinked, pressure sensitive resin and thereafter coated electrostatically with a layer of glass beads, the layer of glass beads will permanently adhere to the surface of the electrostatically sprayed tacky, pressure sensitive resin layer, in the form of a uniform monolayer of beads, without the beads being imbedded in any manner in the resin and without bead-up-bead formation. In this manner, a retroflecting surface can be economically produced capable of producing reflective light of greater angularity and brilliance due to the fact that there is no decrease in the refractive index of the beads that occurs when the beads are partially or totally imbedded in the adhesive resin layer. Furthermore by means of this construction, one can utilize beads of low refractive index, non-uniform sizes and shapes without the need for the beads to be uniformly precision tooled in forming a retroreflecting surface. Additionally the increased reflectivity of the retro-reflective surface of this invention is accomplished without the need for utilizing thick layers of adhesive.

The phenomena whereby glass beads can be made to uniformly and permanently adhere to a surface of a tacky pressure sensitive resin adhesive layer so as not to reduce the refractive index of the beads as well as provide a uniform spacing of the beads without the need of imbedding the glass beads either partially or totally in the resin is due to the combination of providing an electrostatically deposited coating of a tacky, dimensionally stable, pressure sensitive resin and providing an electrostatically deposited layer of glass beads thereupon. This unique structure provides a retroreflecting surface which produces an increased angularity and brilliance of reflective light. The permanent bonding of the glass particles to the surface of the resin layer without being embedded therein, is believed due to the fact that by consecutively applying electrostatic coatings of glass particles and a resin, oppositely charged surfaces are produced which provide polar bonds between the glass bead particles and the resin layer. In this manner the glass beads are permanently bonded tangentially to the top surface of the adhesive resin layer so that the beads are not imbedded in the adhesive resin layer. Hence each of the beads will be separated on the top surface of the resin layer by air so that there is no adhesive resin interference media which will decrease the effective refractive index of the beads. Therefore by the procedure of this invention, a monolayer of beads is deposited on the surface of the resin, said beads being uniformly spaced without bead-upon-bead formation or the formation of any interference layers. Hence by means of this invention, a retroreflecting surface is provided that will produce increased reflectivity, brilliance and angularity of an incident beam of light.

The practice of this invention may now be more fully set forth with regard to the accompanying drawings in which:

FIG. 1 shows in diagram form a retroreflective surface and the concentrated cone of reflected light returning toward the source of an angularly incident ray or beam which produces it.

FIG. 2 is a highly magnified diagrammatic view showing the sectional structure of a retroreflecting surface according to a preferred embodiment of this invention.

FIG. 3 is a highly magnified diagrammatic view showing the sectional structure of a "backless" retroreflecting surface according to another embodiment of this invention.

FIG. 1 makes plain the difference between a retroreflecting surface 5 and other types of reflector surfaces.

In the case of mirrors, which cause specular reflection, an angularly incident ray is reflected back at an equal angle but on the other side of the normal, and hence does not return to the source. In the case of a reflective diffusing surface, the reflective light is spread out in all directions and only a small fraction returns toward the source. But an efficient retroreflecting surface returns the reflected light toward the source in a concentrated cone even though the incident light strikes at an angle, as is illustrated in a diagram.

According to the preferred embodiment of this invention as shown in FIG. 2, the retroreflective surface 5 consists of backing layer 8 having deposited thereon a coating of reflective metal 10 such as aluminum, silver, gold, etc. Electrostatically coated thereon is an adhesive layer 12 consisting of a tacky transparent pressure sensitive, dimensionally stable resin. Electrostatically coated on the resin layer 12 is a monolayer of glass beads 14 which are permanently adhered to and uniformly spaced upon the surface of the resin layer 12. Coated over the monolayer of glass beads 14 is a transparent protective covering layer 16. Covering layer 16 can be applied to the top surfaces of the beads by any conventional coating procedure.

As shown in FIG. 1, the reflective portion of the retroflecting surface is composed of two layers, i.e., a backing layer 8 which can be Mylar, paper, cloth, etc. and a reflective layer 10 which may be formed from any conventional reflective metal. In accordance with this invention, any conventional reflective backing surface may be utilized. The backing surface may be stiff or rigid or flexible. The reflective surface of metal may be coated or adhered to the backing surface by any conventional means such as by spraying, electrodeposition of a thin metallic surface upon the backing layer. On the other hand, the reflective surface can be provided by coating an adhesive on the backing layer and then applying a thin metallic sheet or foil over the adhesive. The reflective surface may be bonded to a spacing film as the result of any suitable coating or lamination procedure to produce a reflective surface having an integral back reflector. The back reflector need not be of a uniformly reflecting nature over its whole area. It may be formed by a printing, stenciling or painting process so that the surface presents desired insignia, designs or lettering, and certain areas may be non-reflective or black. Additionally, the reflective layer then may be a paint or enamel type of coating containing reflective pigment particles. The use of colored pigments will result in the reflective light having a corresponding color. An aluminum paint type of binder coating containing flake aluminum pigment will cause a "silvery" appearance.

As the resin layer 12 any transparent, tacky, pressure sensitive, dimensionally stable resin can be utilized. It is a necessary feature of this invention that the adhesive layer be pressure sensitive and tacky so that the monolayer of beads can be permanently adhered to the surface of the resin. Furthermore the adhesive layer should be dimensionally stable so as to prevent the beads from sinking below the surface of the resin causing them to be partially imbedded therein. It has been found that the best results are achieved by means of partially cross-linking a pressure sensitive resin containing at least one reactive hydroxy group with a thermosetting resin containing from about 1 to 3 reactive hydrogen atoms so as to render the pressure sensitive resin dimensionally stable.

Any conventional pressure sensitive, tacky, transparent resin may be utilized to produce the dimensionally stable, pressure sensitive resin in accordance with this invention. Typical pressure sensitive resins are disclosed in U.S. Patent No. 2,294,930, Palmquist; U.S. Patent No. 3,089,-786, Nachtsheim et al; U.S. Patent No. 3,111,449, Gold et al. Among the preferable pressure sensitive resins that can be utilized to form the adhesive layer 12 in accordance with this invention are the polymers of esters formed from a carboxylic acid such as acrylic acid, methacrylic acid, succinic aid, itaconic acid with a polyhydroxy alcohol such as glycerol, glycol, methylene glycol, pinacone, erythritol, etc.

As the resin which imparts dimensional stability to the pressure sensitive resin, any thermosetting resin containing from about one to about three reactive hydrogen atoms, preferably a reactive hydroxyl radical, can be utilized. Particularly suitable for imparting dimensional stability to pressure sensitive resins in accordance with this invention, are the epichlorohydrin bis phenol polymers such as the Shell Epoxy resins. Other thermosetting resins containing at least one reactive hydrogen atom which may be utilized in accordance with this invention include phenol formaldehyde, melamine formaldehyde, urea formaldehyde, etc. While any conventional thermosetting resin containing at least one reactive hydrogen atom can be utilized in accordance with this invention to add dimensional stability to the tacky transparent pressure sensitive resin, it has been found that best results are achieved by utilizing a thermosetting resin containing from about 1 to 3 reactive hydroxyl groups. In order to achieve the proper dimensional stability in the pressure sensitive resin, it has been found that the thermosetting resin should be present in an amount of from about 20% to 50% by weight based upon the weight of the pressure sensitive resin. Best results have been found by utilizing from about 33% to 50% by weight of the thermosetting resin. Generally if amounts of greater than 50% by weight of the thermosetting resin are utilized, the resulting resin will not be pressure sensitive or tacky.

The resin mixture is applied to the reflective surface 10 by means of an electrostatic spray gun. Generally the resin mixture contains the pressure sensitive resin, the thermosetting resin dissolved in a solvent such as toluol. It is apparent that in applying the resin mixture to the reflective surface any organic solvent capable of dissolving both the pressure sensitive resin and the thermosetting resin may be utilized. Furthermore this resin mixture may contain any conventional polymerization reaction catalyst such as diethylene-triamine, triethyleneamine, calcium acrylate, magnesium acrylate, allylacrylate, hydroxy propyl methacrylate, allyl methacrylamide, bisphenol A dimethacrylate, 2,2 dimethyl propionic acid, 2,2 dimethacrylate, divinyl benzene, divinyloxymethane, methacrylic anhydride, vinyl crotonate,, vinyl trichloro silane, etc. in order to promote rapid crosslinking of the pressure sensitive resin. Generally crosslinking of these systems occurs at room temperatures by means of allowing the solvent to evaporate. However if shorter evaporation and curing times are desired, the electrostatically deposited resin mixture may be heated to a temperature of from about 100° F. to about 375° F.

In accordance with this invention the resin mixture is applied electrostatically to the reflective surface. Any conventional means of electrostatically applying a coating may be utilized to apply the transparent, pressure sensitive, tacky dimensionally stable resin coating to the reflective surface. A typical means of electrostatic coating which may be utilized in accordance with this invention is disclosed in U.S. Patent No. 2,117,029, Hines. Furthermore in accordance with this invention, the adhesive resin mixture should be applied so that it will upon drying leave a film of from about 1 mil to about 2 mils in thickness. While the resin layer may have a thickness of greater than 2 mils or less than 1 mil it has been found that for best results the adhesive layer should have a thickness of from about 1 mil to about 2 mils.

The glass beads can be deposited electrostatically on the resin surface by means of a conventional electrostatic spraying device. By means of the electrostatic coating of the glass beads on the electrostatically deposited adhesive coating, the glass beads will permanently adhere to the surface of the adhesive layer without the need for the beads being imbedded therein. Due to the fact that the beads adhere only to the surface of the resin layer, a considerable variation in bead size will not appreciably affect the optical properties of the retroreflective surface. The index of refraction of the beads may vary from about 1.5 to about 3. Optimum results with this construction are seen to be obtained when the glass beads have a refractive index of from about 1.9 to about 2.1. The preferred size of the glass beads is an average diameter not exceeding 10 mils. A convenient average diameter is approximately 1 to 6 mils, although smaller beads can be used; which result in upwards of 10,000 beads per square inch.

For protective purposes a transparent top sheet 16 may be coated or laminated over the layer of glass beads 14. The top coating or laminate can be any transparent flexible resin as Mylar (polyethylene terephthalate), polymethyl methacrylate, polyethyl methacrylate, etc. The resin top sheet 16 may be applied to the layer of beads 14 in the form of a film forming solution by means of any conventional coating process such as knife coating, roller coating, electrostatic coating. Alternatively, the top sheet or covering 16 may be preformed film or sheet which can be attached to the bead layer 14. In any case the transparent top sheet 16 will not appreciably affect the refracting action of the spheres. Nor will there be any alteration in the angle with which angularly incident light rays strike the underlying spheres, for they will merely be bent in two steps instead of one step in passing from the atmosphere to the glass beads, the end result being the same as though the top sheet 16 was not present.

FIGURE 3 shows a "backless" reflex reflector sheet having the same structure as the one illustrated in FIGURE 2 (the same reference numerals 10, 12, 14 and 16) are used to designate the same elements previously described; but having no backing layer 8 and having an adhesive coating 18 on the back, bonded to the rear face of the reflective surface 10 and which is covered over by a removable liner sheet 20, the latter being optional. The backless reflex reflecting surface is specifically utilized so that it may be instantly adhered to surfaces by means of the adhesive layer 18. The adhesive coating should be water-proof for reflex reflecting sheets intended for outdoor use. It may be of a solvent activatable type, or of a heat activated type, or one which may be activated to adhesiveness either by use of a solvent or by use of heat. Such adhesives are normally non-tacky or substantially so, and require activation at the time of use to produce the desired adhesion or bonding to the base surface to which the sheet is applied, as in making up a sign. A pressure sensitive adhesive coating may be used, which adheres to a surface against which it is pressed without need of activation. The removable liner 20 (when used) protects the exposed back surface of the adhesive coating, and also allows the reflector sheet to be wound in row form without any danger of the adhesive material offsetting on the transparent top coating 16 upon unwinding. The use of liners for adhesive coating on adhesive sheets and tapes is well-known and hence a detailed discussion is unnecessary. The presence of the adhesive coating 18 produces a reflex reflecting surface which is inherently self-sustaining and is complete in itself as regards its fundamental character, the adhesive coating merely making the reflector sheet ready to lay, and taking the place of a cement or adhesive which might otherwise be employed at the time of use to bond the reflector sheet to a base surface, a sign or marker.

The invention will be further illustrated by the following specific example, but it will be understood that the invention is not limited thereto.

EXAMPLE 1

This example illustrates the making of a weatherproof, flexible and stretchable reflex reflector surface of the kind shown in FIGURE 2.

A sheet of Mylar (polyethylene terephthalate having a molecular weight of about 5,000) of 1.5 mil thickness was coated with a continuous film of aluminum. The aluminum powder was deposited on the Mylar sheet to a thickness of 0.5 mil by means of vacuum metalizing so that a continuous reflective film was coated on the Mylar. After the aluminum was coated to a film thickness of 0.5 mil on the Mylar surface, the aluminum surface was coated by electrostatic spraying, with the following solution in an amount sufficient to provide a dried coating having a thickness of about 0.25 mil. This solution had the following formulation:

| Component: | Parts by weight |
|---|---|
| Shell Epoxy 828 (epichlorohydrin bisphenol A copolymer having an epoxide equivalent of 180–195) | 4 |
| Rohm and Haas F–10 (a homopolymer of an acrylic acid ester of a lower molecular weight dihydroxy alcohol, said homopolymer having a density of 1.168 grams per ml. at 20° C. and a hydroxyl equivalent of 0.06 hydroxyl groups per 100 grams of resin) | 10 |
| Diethylene triamine | 0.16 |
| Toluol | 85 |

The solution was sprayed electrostatically on the aluminum surface by means of an apparatus such as disclosed in U.S. Patent 3,117,029. The coating was dried by heating at the temperature of about 315° F. for approximately two minutes to evaporate the toluol solvent. The coating adhered tenaciously to the aluminized surface and provided a uniform tacky, surface adapted to receive the layer of glass beads. After the adhesive layer dried a coating of glass beads was electrostatically sprayed onto the adhesive coating. Glass beads having an average refractive index of about 2 were sprayed electrostatically by an apparatus such as disclosed in U.S. Patent No. 3,117,029, so as to deposit 20 grams of glass beads per square foot. The glass beads had diameters of from about 2 to 3 mils and had a refractive index of from about 1.9 to 2.1. The glass beads uniformly adhered to the adhesive coating in a spaced relationship. There was no bead upon bead formation nor were the beads imbedded in the adhesive coating. The integral transparent covering was next formed by roller coating the beaded surface with the following solution in an amount which will produce a dried coating having a thickness of 2 mils:

| Component: | Parts by weight |
| --- | --- |
| n-Butyl methacrylate polymer (A–10—Rohm and Haas) | 25 |
| Iso-butyl-methacrylate polymer (Poly Bond-Polymer Indus. Inc.) | 25 |
| Xylol (volatile solvent) | 15 |

In this example a solution coating weight of 30 to 35 grams per 24 square inches was used. The coating was dried by heating the web for 20 to 35 minutes at 140° F.

Having described various embodiments of the invention, for purposes of illustration rather than limitation, what I claim is as follows:

1. A retro-reflecting surface having a multiplicity of transparent spherical glass beads forming a surface monolayer of lens elements, a light reflective backing underlying said glass beads and united thereto by means of a transparent dimensionally stable, tacky, pressure sensitive resin layer to produce in combination with said beads reflex reflection of incident light, said glass beads being electrostatically bonded tangentially to the upper surface of said resin layer in a spaced relationship so as to lie on top of said resin layer.

2. The retro-reflecting surface of claim 1, wherein the light reflective backing comprises a stiff backing material having a reflective metal coated thereon.

3. The retro-reflective surface of claim 1, wherein a transparent protective covering is adhered to the upper surface of said monolayer of beads.

4. The retro-reflecting surface of claim 1, wherein said resin layer contains a pressure sensitive resin containing at least one reactive hydroxy group crosslinked with a thermosetting resin containing from about 1 to 3 reactive hydrogen atoms.

5. The retro-reflecting surface of claim 3, wherein said pressure sensitive resin is a homopolymer of an acrylic acid ester and said thermosetting resin is a copolymer of epichlorohydrin and bis-phenol A.

6. A retro-reflecting surface including a multiplicity of transparent spherical glass beads forming a surface monolayer of lens elements, a light reflective backing underlying said glass beads and united thereto by means of a transparent dimensionally stable pressure sensitive resin layer to produce in combination with said beads reflex reflection of incident light, said glass beads being electrostatically bonded tangentially to the upper surface of the resin layer in a spaced relationship, a transparent protective sheet adhere to the upper surface of the monolayer of glass beads, an adhesive binder coated on the under surface of said reflective backing, a carrier sheet releasably adhered by means of said adhesive binder to said reflective backing.

7. A retro-reflecting surface of claim 5, wherein said resin layer is composed of a pressure sensitive resin having at least one reactive hydroxyl group crosslinked with a thermosetting resin having from about 1 to 3 reactive hydrogen atoms.

8. A retro-reflective surface including a reflective layer capable of reflecting light, an adhesive layer consisting of a transparent, tacky, dimensionally stable, pressure sensitive resin electrostatically coated thereon, a monolayer consisting of a multiplicity of spaced glass beads electrostatically coated on the upper surface of the resin layer overlying said reflective layer to produce in combination with said reflective layer reflex reflection of incident light, said glass beads being adhesively bonded tangentially to said upper surface of the adhesive layer in a spaced relationship.

9. A retro-reflective surface including a reflective layer capable of reflecting light, an adhesive layer consisting of a transparent, tacky, dimensionally stable, pressure sensitive resin electrostatically coated thereon, a monolayer consisting of a multiplicity of spaced glass beads electrostatically coated on the upper surface of the resin layer overlying said reflective layer to produce in combination with said reflective layer reflex reflection of incident light, said glass beads being adhesively bonded tangentially to said upper surface of the adhesive layer in a spaced relationship, and a transparent top protective coating adhered to the upper surface of said monolayer of glass beads.

10. The retro-reflective surface of claim 9 wherein said resin comprises a pressure sensitive resin containing at least one reactive hydroxyl group crosslinked with a thermosetting resin containing from about 1 to 3 hydrogen atoms.

11. The retro-reflecting surface of claim 10 wherein said pressure sensitive resin is a homopolymer of an acrylic acid ester and said thermosetting resin is a copolymer of epichlorohydrin and bis-phenol A.

12. A method of producing a retro-reflecting surface comprising providing a backing layer capable of reflecting light, electrostatically coating on the reflecting backing a transparent, tacky dimensionally stable, pressure sensitive resin, electrostatically depositing on said pressure sensitive dimensionally stable resin a monolayer of spherical glass beads in spaced relationship so as to adhesively adhere said glass beads tangentially to the upper surface of the said resin.

13. The process of claim 12, wherein said resin is a pressure sensitive resin containing at least one reactive hydroxyl group crosslinked with a thermosetting resin containing from about 1 to 3 reactive hydrogen atoms.

14. The process of claim 13, wherein said pressure sensitive resin is a homopolymer of an acrylic acid ester and said thermosetting resin is a copolymer of bis-phenol A and epichlorohydrin.

15. A method of producing a retro-reflecting surface comprising providing a backing layer capable of reflecting light, electrostatically coating on the reflective backing a transparent, tacky dimensionally stable, pressure sensitive resin, electrostatically depositing on said pressure sensitive dimensionally stable resin a monolayer of spherical glass beads in spaced relationship so as to adhesively adhere said glass beads tangentially to the upper surface of the said resin, and coating the upper surface of said monolayer of glass beads with a transparent resin.

16. A method of claim 15, wherein said resin is a pressure sensitive resin containing at least one reactive hydroxyl group crosslinked with a thermosetting resin containing from about 1 to 3 reactive hydrogen atoms.

17. A method of claim 16, wherein said pressure sensitive resin is a homopolymer of an acrylic acid ester and said thermosetting resin is a copolymer of bis-phenol A and epichlorohydrin.

References Cited

UNITED STATES PATENTS

| 3,014,409 | 12/1961 | Palmquist. | |
| 3,065,559 | 11/1962 | McKenzie | 161—4 |
| 3,253,971 | 5/1966 | Garling | 161—406 XR |

ROBERT F. BURNETT, *Primary Examiner.*

W. POWELL, *Assistant Examiner.*